(12) United States Patent
Kordahi

(10) Patent No.: US 6,728,451 B2
(45) Date of Patent: Apr. 27, 2004

(54) OPTICAL FIBER HOLDING STRUCTURE AND METHOD OF MAKING SAME

(75) Inventor: Maurice Kordahi, Atlantic Highlands, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 357 days.

(21) Appl. No.: 09/764,555

(22) Filed: Jan. 17, 2001

(65) Prior Publication Data

US 2002/0048445 A1 Apr. 25, 2002

Related U.S. Application Data

(63) Continuation-in-part of application No. 09/399,752, filed on Sep. 21, 1999.

(51) Int. Cl.[7] .................................................. G02B 6/44
(52) U.S. Cl. ....................... 385/100; 385/105; 385/110; 385/113; 385/114; 385/95
(58) Field of Search ................................. 385/100, 105, 385/110, 113, 114, 95, 96, 97, 98, 99, 86, 87, 135, 136, 137

(56) References Cited

U.S. PATENT DOCUMENTS

| | | | |
|---|---|---|---|
| 4,019,241 A | | 4/1977 | Logan .......................... 29/407 |
| 4,129,932 A | | 12/1978 | Stancati ....................... 29/407 |
| 4,378,145 A | * | 3/1980 | Stancati |
| 4,729,625 A | * | 7/1984 | Loscoe |
| 4,507,008 A | | 3/1985 | Adl et al. .................... 403/275 |
| 5,177,808 A | * | 10/1990 | Satake et al. |
| 5,473,724 A | * | 3/1993 | Board |
| 5,469,522 A | * | 12/1993 | Fan |
| 5,684,911 A | * | 9/1995 | Burgett |
| 5,642,451 A | * | 12/1995 | Kennedy |
| 5,832,162 A | * | 11/1998 | Sarbell ......................... 385/99 |
| 6,244,756 B1 | * | 6/2001 | Bloom ......................... 385/94 |

OTHER PUBLICATIONS

"Lighthouse Fusion" Thomas & Betts (Author) at least as early as 1 year prior to the filing date of the above Identified Patent Applications 4 Pages.

* cited by examiner

*Primary Examiner*—Hung Xuan Dang
*Assistant Examiner*—Tuyen Tra

(57) ABSTRACT

An optical fiber holding structure is used to restrain high fiber count fibers or to provide splice protection in a cable joint. Layers of fibers are inserted between a compliant splint member and a semi-rigid splint member, which are positioned within an outer gripping tube such as a heat shrink tube. Optionally, an internal support can be positioned between the layers of fibers. The assembly is heated causing the heat shrink tube to apply a gripping force to the splint members and fibers supported therebetween. Where more than two layers of fibers are being restrained, internal supports can be positioned between each of the fiber layers. One type of internal support includes a rigid beam coated with a compliant material.

51 Claims, 5 Drawing Sheets

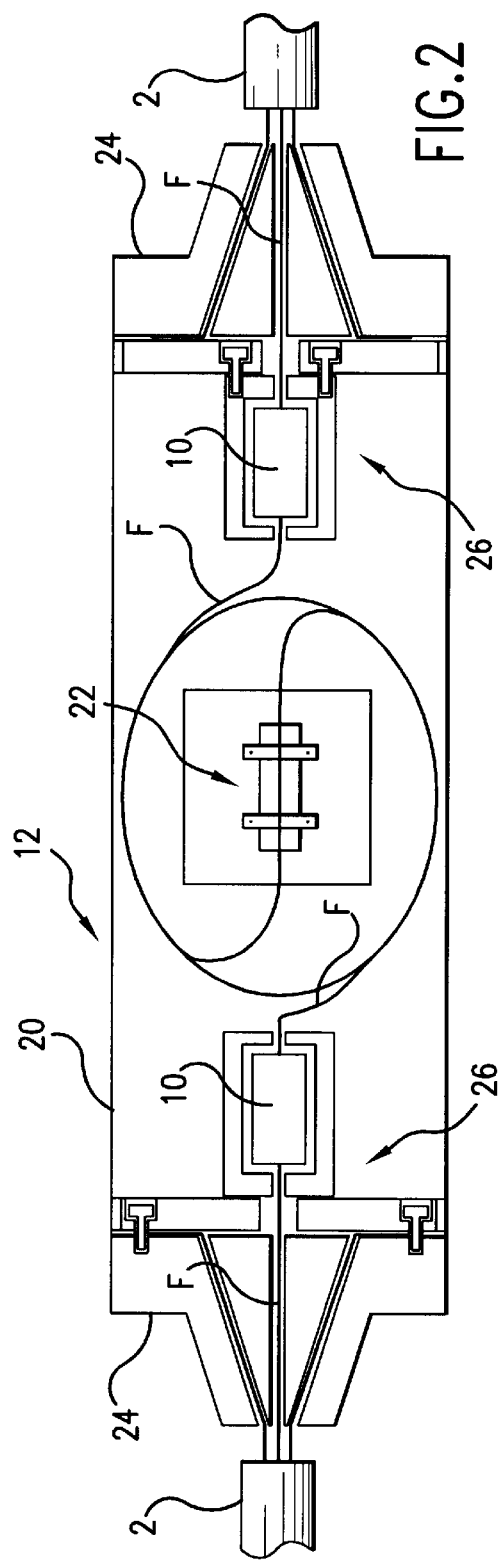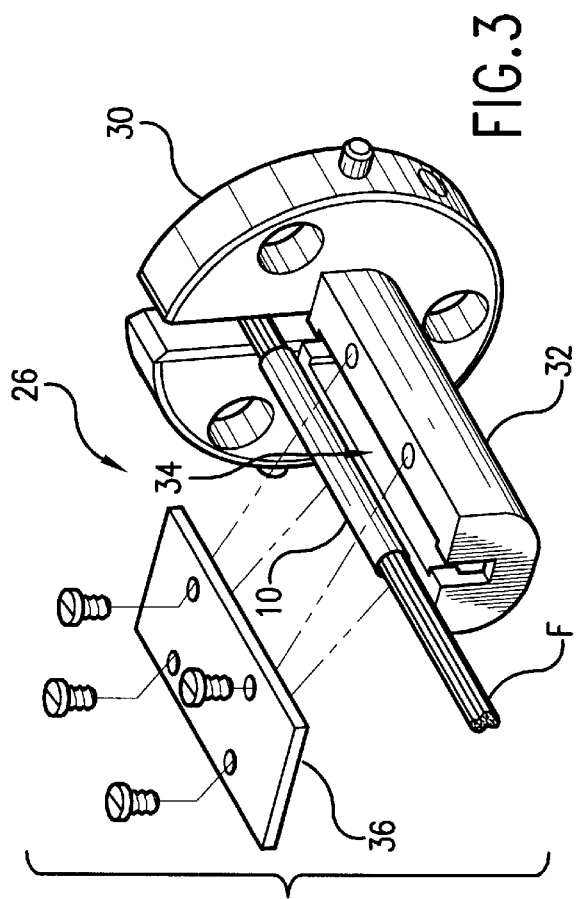

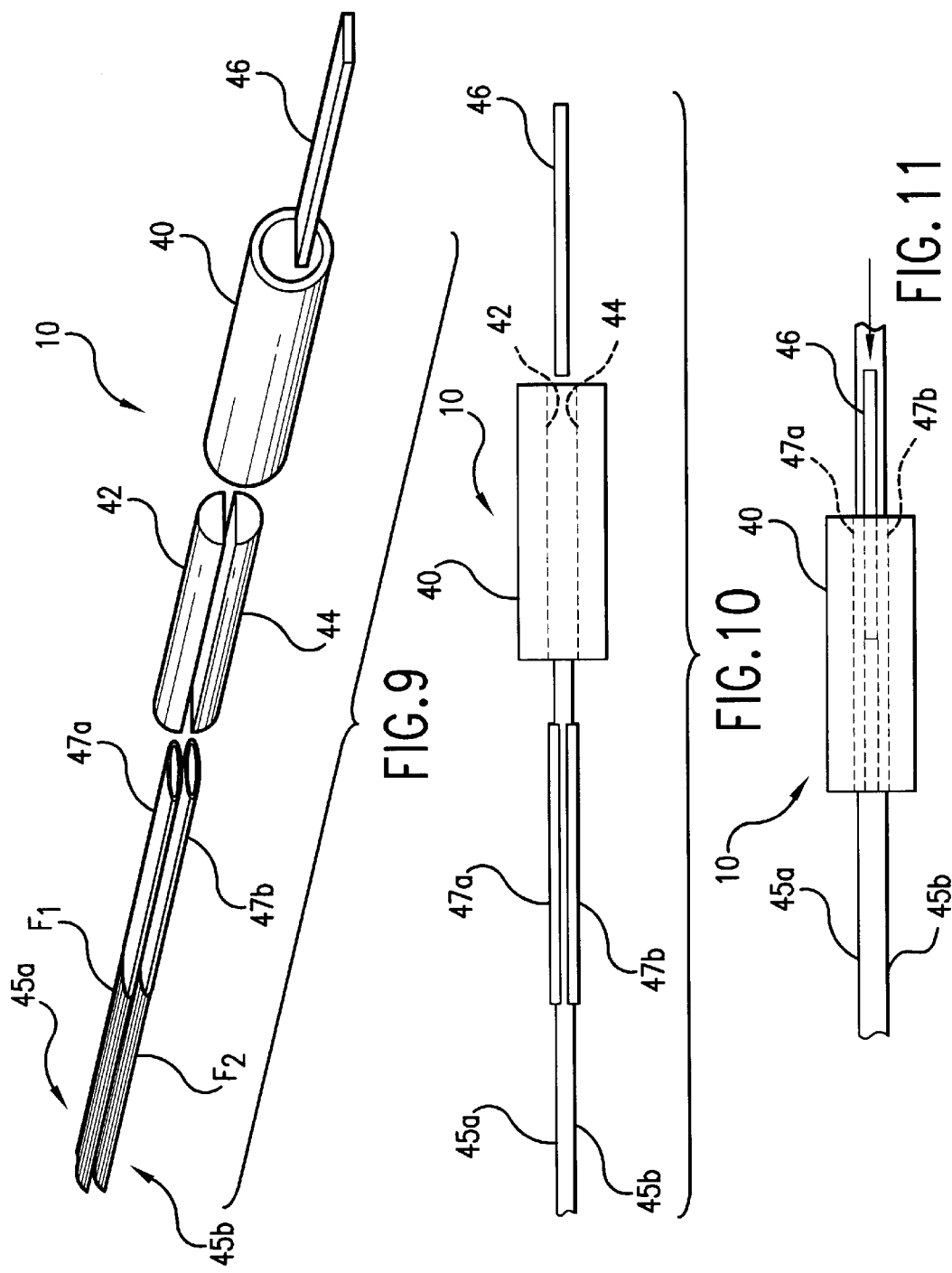

OPTICAL FIBER HOLDING STRUCTURE AND METHOD OF MAKING SAME

CROSS-REFERENCE TO RELATED APPLICATIONS

This application is a continuation-in-part of U.S. patent application Ser. No. 09/399,752, entitled FIBER RETAINING SYSTEM filed Sep. 21, 1999.

TECHNICAL FIELD

The present invention relates to holding loose optical fibers and, more particularly, to an optical fiber holding structure that restrains multiple layers of loose fibers or protects a fiber splice within a cable joint.

BACKGROUND INFORMATION

Optical fibers are deployed across many miles of ocean and other large bodies of water to establish communication networks. For protection in an undersea environment, optical fibers can be contained within a protective cable. According to one type of prior art fiber optic cable 2, FIG. 1, the optical fibers F are contained within a loose tube 6, which is surrounded by protective layers 8. The protective layers 8 typically include an outer insulating plastic coating, a copper sheath inside the outer coating, and high strength members, such as steel wires, inside of the copper sheath. This type of cable 2 is useful in high strength applications and permits the fibers F to move with respect to the protective layers 8.

Because these fiber optic cables cannot be made and deployed in infinite lengths, sections of the cables must be attached together to extend across large distances. A splicing process is typically used to attach the optical fibers. To protect the splices from the environment, the spliced sections are commonly contained in a watertight housing, often referred to as a joint box. A joint box may also be used when making splices in the field, for example, when a cable must be repaired.

The cable joint is often subjected to substantial tension applied to the cable, for example, during deployment of cable into the sea by a ship. The joint box is intended to prevent the applied tension forces from being absorbed by the fiber splice. Because the optical fibers are able to move within the cable, the joint box is also intended to prevent the spliced portion from being pulled into the cable. In one prior joint box design, the high strength steel wires are clamped to a first end of a joint box between a socket body and a plug and sleeve arrangement, as disclosed in U.S. Pat. No. 4,507,008, entitled STRANDED CABLE TERMINATION ARRANGEMENT and incorporated herein by reference. The fibers extend unrestrained through the hollow plug and sleeve to a center section or shelf of the joint box, and the ends of the fibers are spliced. The joined fibers are coiled onto the center section with a large amount of slack (e.g., about three feet) and with the fiber splice fixed within the center section. The large amount of slack enables the spliced optical fibers to be pulled or tensioned without placing stress on the fiber splice and without the fiber splice being pulled into one of the cables.

However, this joint box design has some drawbacks. For example the large amount of excess slack may be undesirable from an assembly standpoint. Further, when the excess slack is bent to fit within the housing, the fibers could become damaged. If the excess slack is removed, the stresses and strains will be applied at the splice affixed within the housing.

Accordingly, there is a need for an optical fiber holding structure that restrains loose fibers in a cable joint and prevents having to use a large amount of excess slack fiber within the joint box. Although existing splice protection devices may be capable of acting as a fiber holding structure, such devices are not capable of accommodating high fiber counts without causing damage (e.g., microbending) to the fibers. Thus, there is also a need for an optical fiber holding structure capable of restraining high fiber count fibers or providing splice protection for high fiber counts.

SUMMARY OF THE INVENTION

One aspect of the present invention is an optical fiber holding structure for holding at least first and second layers of optical fibers. The optical fiber holding structure comprises an outer gripping tube, a semi-rigid splint member positioned within the outer gripping tube, and a compliant splint member positioned within the outer gripping tube. The first and second layers of optical fibers preferably pass between the semi-rigid splint member and the compliant splint member. The outer gripping tube causes the first and second layers of fibers to be gripped between the semi-rigid splint member and the compliant splint member. The optical fiber holding structure can be used as a fiber restraint where the optical fibers pass continuously through the holding structure or as a splice protection device where the optical fibers are spliced within the holding structure.

According to one preferred embodiment, the outer gripping tube is a heat shrink tube, and each layer of fibers is ribbonized and surrounded by adhesive. The semi-rigid splint member and the compliant splint member preferably have a generally semi-cylindrical shape. The semi-rigid splint member is preferably made of glass, and the compliant splint member is preferably made of plastic.

According to one embodiment, an internal support is positioned between the first and second layers of optical fibers. One embodiment of the internal support is made of a compliant material. Another embodiment of the internal support includes a rigid beam, such as an I-channel, an H-channel, or a rectangular channel, coated with a compliant material.

According to another embodiment, a third layer of optical fibers extends through the outer gripping tube between the splint members. A compliant internal support is positioned between the first and third layers of optical fibers, and a semi-rigid internal support is positioned between the second and third layers of optical fibers. According to a further embodiment, the first and second layers of fibers are held without any internal support.

According to a further aspect of the present invention, the optical fiber holding structure is provided as an assembly comprising the outer gripping tube, the splint members, and at least one internal support adapted to be assembled for holding layers of optical fibers.

Another aspect of the present invention is a method of holding optical fibers. The method comprises: inserting a compliant splint member and a semi-rigid splint member within a heat shrink tube; inserting first and second layers of optical fibers into the heat shrink tube and between the compliant splint member and the semi-rigid splint member; and heating the heat shrink tube containing the compliant splint member and the semi-rigid splint member and the optical fibers to form an optical fiber holding structure. The method also preferably includes the step of inserting the first and second layers of fibers in hot melt glue tubes.

One method further includes ribbonizing the optical fibers in each of the layers of optical fibers. Another method further includes splicing fibers together in each of the layers of optical fibers.

BRIEF DESCRIPTION OF THE DRAWINGS

These and other features and advantages of the present invention will be better understood by reading the following detailed description, taken together with the drawings wherein:

FIG. 2 is a schematic cross-sectional view of a joint box including optical fiber holding structures, according to the present invention;

FIG. 3 is an exploded perspective view of a restraint retaining assembly that can be used in the joint box shown in FIG. 2;

FIG. 9 is an exploded perspective view of an optical fiber holding structure assembly, according to one embodiment of the present invention; and FIGS. 10 and 11 are side views of the optical fiber holding structure assembly shown in FIG. 9, partially assembled.

DETAILED DESCRIPTION OF THE PREFERRED EMBODIMENTS

Figure 1:
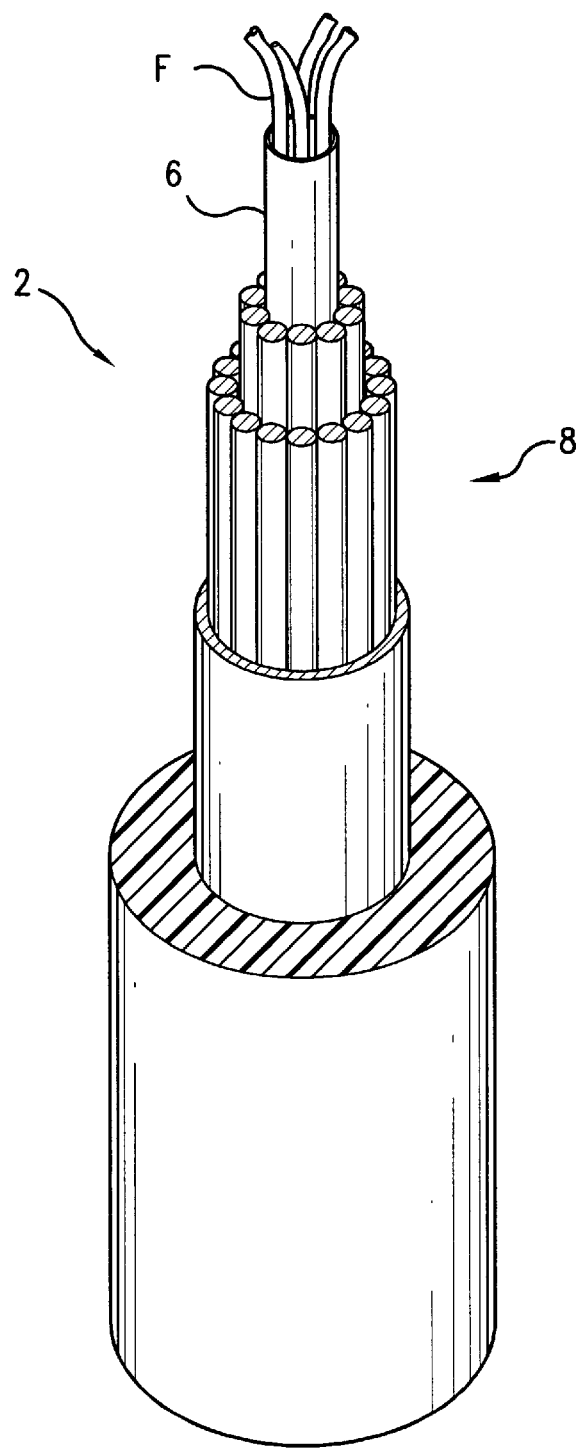
FIG. 1 is a perspective view of a prior art fiber optic cable.

The optical fiber holding structure 10, shown in FIG. 2, according to the present invention, can be used to restrain optical fibers F or to protect spliced optical fibers. In the exemplary embodiment, the fiber holding structure 10 is used to restrain the loose tube optical fibers F extending from fiber optic cables 2 joined at a cable joint 12. The cable joint 12 includes a housing or joint box 20 connected to the free ends of the cables 2 using cable terminations 24. The free ends of the optical fibers F pass through the cable terminations 24 and are joined by a fiber splice 22 housed and secured within the joint box 20.

The optical fiber holding structure 10 is retained in a restraint retaining assembly 26. According to the exemplary embodiment, the retaining assembly 26, FIG. 3, includes a shelf retainer 30 and a restraint retainer 32. The restraint retainer 32 includes a longitudinal trough 34 that receives and retains the optical fiber holding structure 10. A top cover 36 is secured to the restraint retainer 32 to secure the fiber holding structure 10 within the trough 34. Although the optical fiber holding structure 10 is described in the context of this exemplary joint box 20, the optical fiber holding structure 10 can also be used to restrain fibers in other types of joints or connections or in any other arrangement where optical fibers must be restrained. The optical fiber holding structure 10 can also be used with other types of retaining assemblies. The optical fiber holding structure 10 further can be used in the fiber splice 22 as a splice protection device.

Figure 4:
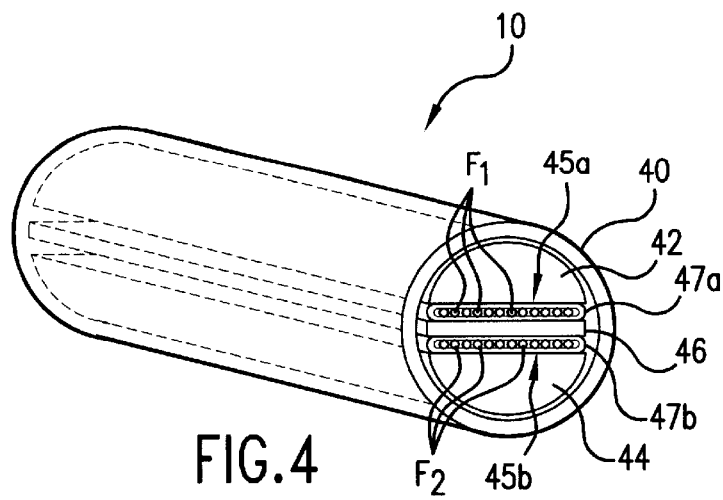
FIGS. 4–6 are perspective views of the optical fiber holding structure, according to various embodiments of the present invention.

According to one embodiment, the optical fiber holding structure 10, FIG. 4, includes a heat shrink tube 40, a semi-rigid splint member 42, a compliant splint member 44, and an internal support 46. A first layer of fibers $F_1$ passes between the first splint member 42 and the internal support 46, and a second layer of fibers $F_2$ passes between the second splint member 44 and the internal support 46. Each of the layers of fibers $F_1$, $F_2$ are preferably ribbonized to form a first fiber ribbon 45a and a second fiber ribbon 45b. The optical fiber holding structure 10 can also include hot melt glue tubes 47a, 47b surrounding each of the layers of fibers $F_1$, $F_2$. When heated, the hot melt glue tubes 47a, 47b melt around the respective layers of fibers $F_1$, $F_2$ and the heat shrink tube 40 applies a gripping force to the splint members 42, 44 such that the layers of fibers $F_1$, $F_2$ are gripped between the internal support 46 and respective splint members 42, 44.

The splint members 42, 44 preferably have a generally semi-cylindrical shape with a rounded portion and flat portion. The rounded portions of the splint members 42, 44 generally conform to the inner surface of the heat shrink tube 40. The flat portions of the splint members 42, 44 support the respective layers of fibers $F_1$, $F_2$. Although specific shapes for the splint members and heat shrink tube are shown and described, other shapes are within the scope of the present invention. Also, other types of gripping members can be used around the splint members in addition to or in place of the heat shrink tube.

The semi-rigid splint member 42 is preferably made of a semi-rigid material, such as glass or metal. The compliant splint member 44 is preferably made of a compliant material including, for example, a single piece of plastic material or at least one layer or coating of compliant material. The semi-rigid splint member 42 provides strength and rigidity to keep the fibers F straight when gripped within the fiber holding structure 10. The compliant splint member 44 allows the optical fiber holding structure 10 to have a generally stress free structure under minimal internal stresses to prevent damage to the coating on the fibers F. According to one embodiment, the internal support 46 can also be made of a compliant material.

The optical fiber holding structure 10 thus provides a gripping force sufficient to prevent the fibers F from translating into or out of the fiber holding structure 10 but without causing damage to the fibers F. When a pulling force on the optical fibers F is created, the force is distributed over the entire optical fiber holding structure 10. Because the effect of transference of the tensile forces is a function of the length of contact between the fibers F and the holding structure 10, the length of the fiber holding structure 10 can be designed based on expected tensile loads. According to one example, the length of the holding structure 10 is in the range of about 1 in. to 2 in and the diameter of the fiber holding structure 10 is about ¼ in. Various other sizes are contemplated, for example, depending on the number of fibers and expected tensile loads.

Figure 5:
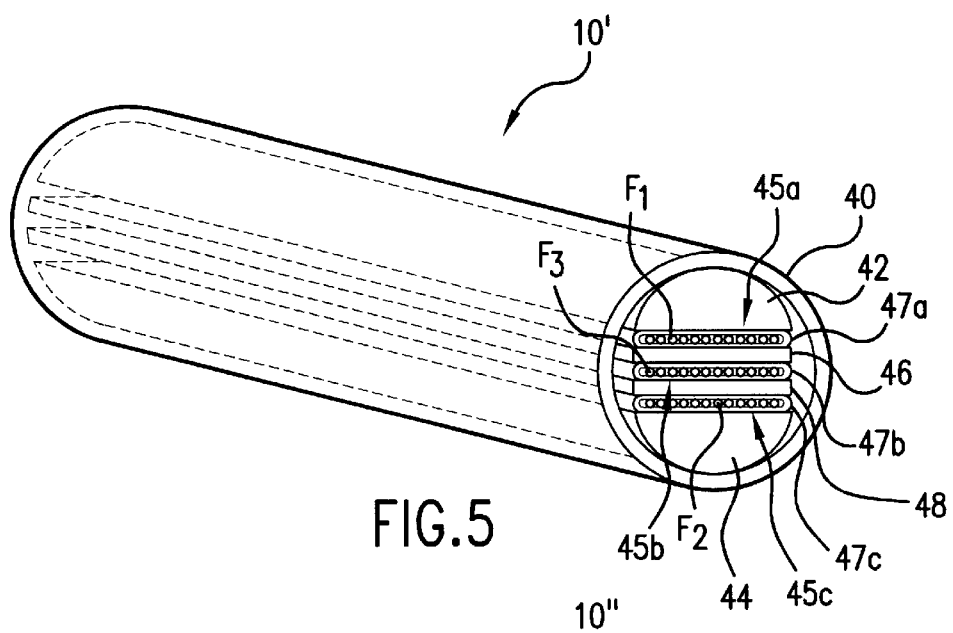

According to another embodiment, the optical fiber holding structure 10', FIG. 5, includes a third layer of fibers $F_3$ or fiber ribbon 45c within a hot melt glue tube 47c. Internal supports 46, 48 are positioned between each of the fiber ribbons 45a–c. In this embodiment, one of the internal supports 46 can be made of a compliant material, such as plastic, and the other internal support 48 can be made of a semi-rigid material, such as glass. The splint members 42, 44 and internal supports 46, 48 thus alternate between semi-rigid and compliant materials.

Layering multiple layers of fibers $F_1$, $F_2$, $F_3$ or fiber ribbons 45a–c with internal supports 46, 48 between each layer or fiber ribbon enables high fiber counts to be restrained or spliced within a cable joint or other such structure. Although the exemplary embodiments show layers with eight fibers or twelve fibers, the layers or fiber ribbons can accommodate more or less fibers as needed. For example, the optical fiber holding structure 10' shown in FIG. 5 can be used to restrain or splice up to thirty-six (36) fibers by inserting three layers of twelve fibers. Additional layers of fibers or fiber ribbons and internal supports can also be added to further increase the fiber count.

Figure 6:
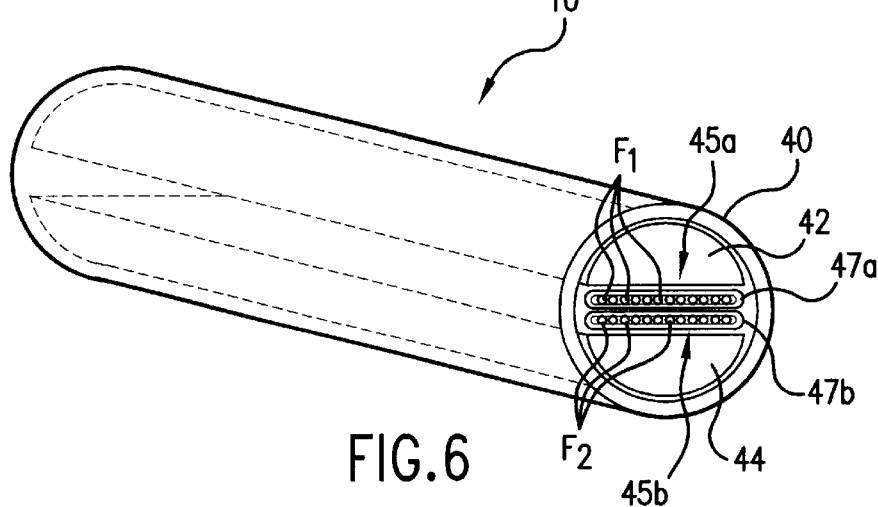

A further embodiment of the optical fiber holding structure 10", FIG. 6, includes two layers of fibers $F_1$, $F_2$ or fiber ribbons 45a, 45b without any internal support. If more than two layers of fibers are restrained or spliced without internal supports, however, the fibers might experience microbending as the fibers are squeezed together.

Figure 7:
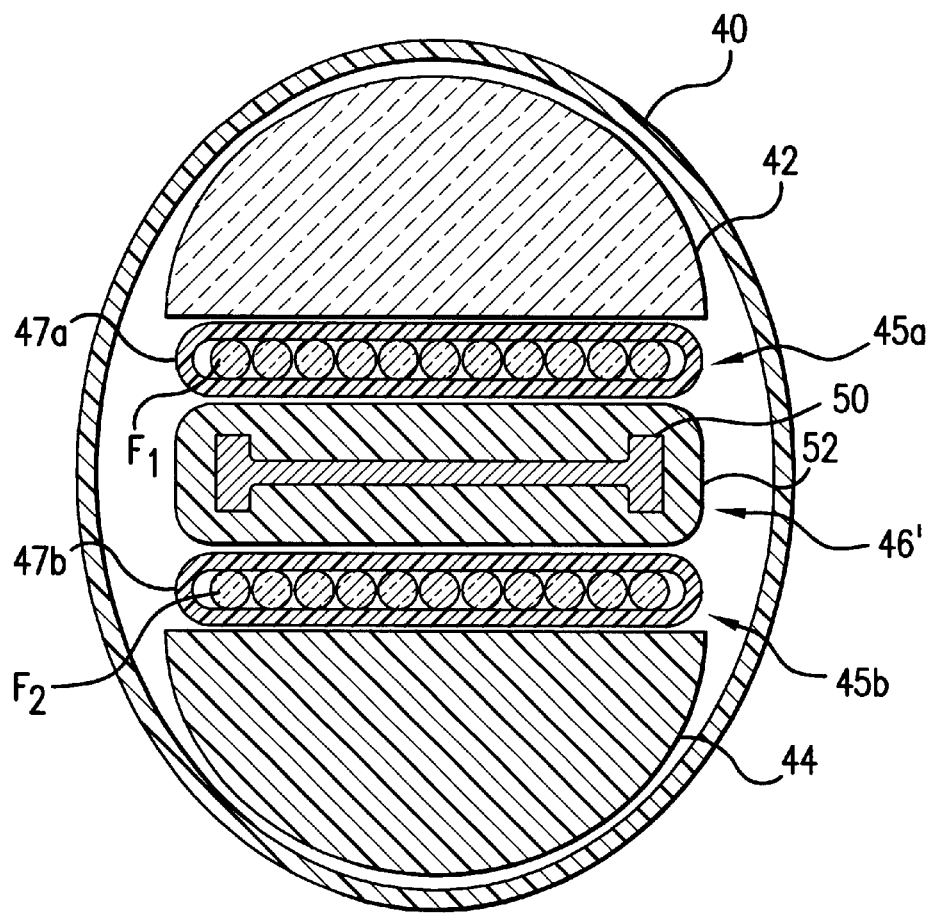
FIG. 7 is a cross-sectional view of the optical fiber holding structure having an internal support, according to another embodiment of the present invention.
Figure 8:
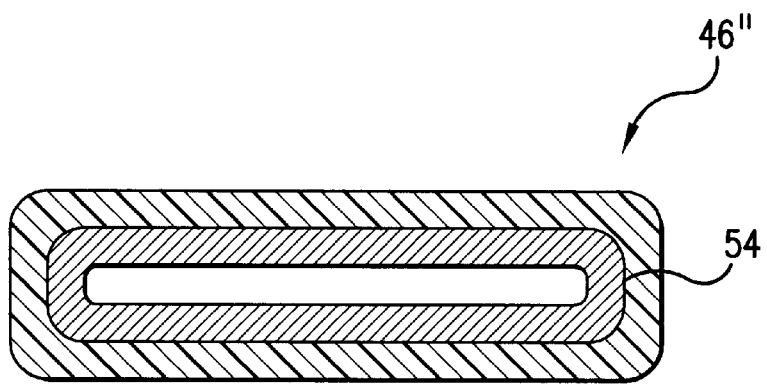
FIG. 8 is a cross-sectional view of an internal support, according to a further embodiment of the present invention.

One preferred embodiment of the internal support 46', FIG. 7, includes a rigid beam 50 coated with a compliant material 52. The rigid beam 50 can be made from metal, glass or a rigid fiber member such as carbon. The compliant material 52 preferably has no residual strains and can be made from a stable plastic, such as polyethylene (PE) or polytetrafluoroethylene (PTFE). The rigid beam 50 is preferably shaped to prevent bending along the length of the beam and has the shape of an I-channel or H-channel in one embodiment (shown in FIG. 7). An alternative embodiment of the internal support 46", FIG. 8, includes a rigid beam 54 shaped as a rectangular channel. Rigid beams having other shapes that prevent bending are also within the scope of the present invention.

One method of assembling and forming the optical fiber holding structure 10 is shown generally in FIGS. 9–11. The fibers F are ribbonized, for example, in layers of twelve or eight fibers, resulting in two or more fiber ribbons 45a, 45b. Ribbonizing the fibers F includes organizing and attaching the fibers F to each other in a line. The fibers F are preferably ribbonized along at least the length of the fibers F to be gripped within the optical fiber holding structure 10. One example of the ribbonizing process is described in greater detail in U.S. patent application Ser. No. 09/399,752, entitled "Fiber Retaining System" which is commonly owned and incorporated herein by reference.

The fiber ribbons 45a, 45b are inserted into hot melt glue tubes 47a, 47b, and the splint members 42, 44 are inserted into the heat shrink tube 40 (FIG. 10). The splint members 42, 44 and heat shrink tube 40 are then slid onto the ribbonized fibers contained in the hot melt glue tubes 47a, 47b. If used, the internal support 46 is then inserted between the hot melt glue tubes 47a, 47b containing the fiber ribbons 45a, 45b (FIG. 11). Additional fiber ribbons and internal supports can be inserted in the same manner.

Once assembled, heat is applied to the assembly, for example, using a heat gun, an oven, or any other heating device, to cause hot melt glue tubes 47a, 47b to melt and to cause the heat shrink tube 40 to shrink around the splint members 42, 44. This forms a single splint wherein the fibers F are gripped between the splint members 42, 44 and the internal support 46. The optical fiber holding structure 10 can then be positioned within the retaining assembly 26, as described above (see FIG. 3). The fibers F are thus prevented from moving into the cable 2 and the force on the fibers F is transferred to the joint box 20 via the retaining assembly 26.

Although the fiber holding structure is shown and described in the above method as a fiber restraint, the fiber holding structure according to any of the embodiments disclosed above can also be used as a splice protection device. According to this method, the layers of fibers $F_1$, $F_2$, $F_3$ include fibers that have been spliced together. The spliced portions of the fibers F are gripped between the splint members 42, 44 and the internal support(s) 46.

Accordingly, the optical fiber holding structure of the present invention is capable of providing fiber restraint or splice protection for high fiber count fibers while minimizing damage to the fibers.

Modifications and substitutions by one of ordinary skill in the art are considered to be within the scope of the present invention, which is not to be limited except by the claims that follow.

What is claimed is:

1. An optical fiber holding structure comprising:
   an outer gripping tube;
   a semi-rigid splint member made of a semi-rigid material and positioned within said outer gripping tube;
   a compliant splint member made of a compliant material and positioned within said outer gripping tube; and
   at least first and second layers of optical fibers passing between said semi-rigid splint member and said compliant splint member, wherein said outer gripping tube causes said first and second layers of optical fibers to be gripped between said semi-rigid splint member and said compliant splint member.

2. The optical fiber holding structure of claim 1 wherein said outer gripping tube is a heat shrink tube.

3. The optical fiber holding structure of claim 1 wherein each of said first and second layers of fibers are ribbonized.

4. The optical fiber holding structure of claim 3 further comprising an adhesive around said first and second layers of fibers.

5. The optical fiber holding structure of claim 1 wherein said optical fibers pass continuously between said semi-rigid splint member and said compliant splint member such that said optical fiber holding structure acts as a fiber restraint.

6. The optical fiber holding structure of claim 1 wherein said optical fibers are spliced together between said semi-rigid splint member and said compliant splint member such that said optical fiber holding structure acts as a splice protection device.

7. The optical fiber holding structure of claim 1 wherein said semi-rigid splint member is made of glass.

8. The optical fiber holding structure of claim 1 wherein said compliant splint member is made of plastic.

9. The optical fiber holding structure of claim 1 wherein said semi-rigid splint member is made of glass, and wherein said compliant splint member is made of plastic.

10. The optical fiber holding structure of claim 1 further including an internal support positioned between said first and second layers of optical fibers.

11. The optical fiber holding structure of claim 10 wherein said internal support is made of a compliant material.

12. The optical fiber holding structure of claim 10 wherein said internal support includes a rigid beam coated by a compliant material.

13. The optical fiber holding structure of claim 12 wherein rigid beam is shaped as an I-channel or H-channel.

14. The optical fiber holding structure of claim 12 wherein rigid beam is shaped as a rectangular channel.

15. The optical fiber holding structure of claim 1 further including:
   a third layer of optical fibers passing between said semi-rigid splint member and said compliant splint member;
   a compliant internal support between said first and third layers of optical fibers; and
   a semi-rigid internal support between said second and third layers of optical fibers.

16. The optical fiber holding structure of claim 15 wherein said compliant internal support is made of plastic, and said semi-rigid internal support is made of glass.

17. The optical fiber holding structure of claim 1 wherein said semi-rigid splint member and said compliant splint member have a semi-cylindrical shape.

18. An optical fiber holding structure assembly comprising:
   an outer gripping tube;
   a semi-rigid splint member adapted to be positioned within said outer gripping tube;
   a compliant splint member adapted to be positioned within said outer gripping tube; and
   at least one internal support adapted to be positioned between said semi-rigid splint member and said compliant splint member to allow fibers to be positioned between said internal support and each of said splint members, wherein said internal support includes a rigid beam coated by a compliant material.

19. The optical fiber holding structure assembly of claim 18 further comprising at least first and second hot melt glue tubes adapted to receive said fibers.

20. The optical fiber holding structure assembly of claim 18 wherein rigid beam is shaped as an I-channel or H-channel.

21. The optical fiber holding structure assembly of claim 18 wherein said rigid beam is shaped as a rectangular channel.

22. A method of holding optical fibers, comprising:
   inserting a compliant splint member and a semi-rigid splint member within a heat shrink tube;
   inserting at least first and second layers of optical fibers into said heat shrink tube and between said compliant splint member and said semi-rigid splint member; and
   heating said heat shrink tube containing said compliant splint member and said semi-rigid splint member and said optical fibers to form an optical fiber holding structure, wherein said compliant splint member and said semi-rigid splint member grip said first and second layers of optical fibers.

23. The method of claim 22 further including inserting an internal support between said first and second layers of optical fibers.

24. The method of claim 23 wherein said internal support is made of a compliant material.

25. The method of claim 22 further including the step of inserting said first and second layers of fibers in hot melt glue tubes.

26. The method of claim 22 further including:
   inserting a third layer of fibers into said heat shrink tube; and
   inserting internal supports between said first and third layers of fibers and between said second and third layers of fibers.

27. The method of claim 22 further including ribbonizing each of said layers of fibers.

28. The method of claim 22 further including splicing fibers together in each of said layers of fibers.

29. An optical fiber holding structure made according to a method of holding optical fibers, comprising:
   inserting a compliant splint member and a semi-rigid splint member within a heat shrink tube;
   inserting at least first and second layers of optical fibers into said heat shrink tube and between said compliant splint member and said semi-rigid splint member; and
   heating said heat shrink tube containing said compliant splint member and said semi-rigid splint member and said optical fibers to form an optical fiber holding structure, wherein said compliant splint member and said semi-rigid splint member grip said first and second layers of optical fibers.

30. An optical fiber holding structure comprising:
   an outer gripping tube;
   a semi-rigid splint member positioned within said outer gripping tube;
   a compliant splint member positioned within said outer gripping tube;
   at least first and second layers of optical fibers passing between said semi-rigid splint member and said compliant splint member, wherein said outer gripping tube causes said first and second layers of optical fibers to be gripped between said semi-rigid splint member and said compliant splint member; and
   at least one internal support positioned between said at least first and second layers of optical fibers.

31. The optical fiber holding structure of claim 30 wherein said outer gripping tube is a heat shrink tube.

32. The optical fiber holding structure of claim 30 wherein each of said first and second layers of fibers are ribbonized.

33. The optical fiber holding structure of claim 32 further comprising an adhesive around said first and second layers of fibers.

34. The optical fiber holding structure of claim 30 wherein said optical fibers pass continuously between said semi-rigid splint member and said compliant splint member such that said optical fiber holding structure acts as a fiber restraint.

35. The optical fiber holding structure of claim 30 wherein said optical fibers are spliced together between said semi-rigid splint member and said compliant splint member such that said optical fiber holding structure acts as a splice protection device.

36. The optical fiber holding structure of claim 30 wherein said semi-rigid splint member is made of glass.

37. The optical fiber holding structure of claim 30 wherein said compliant splint member is made of plastic.

38. The optical fiber holding structure of claim 30 wherein said semi-rigid splint member is made of glass, and wherein said compliant splint member is made of plastic.

39. The optical fiber holding structure of claim 30 wherein said internal support is made of a compliant material.

40. The optical fiber holding structure of claim 30 wherein said internal support includes a rigid beam coated by a compliant material.

41. The optical fiber holding structure of claim 40 wherein rigid beam is shaped as an I-channel or H-channel.

42. The optical fiber holding structure of claim 40 wherein rigid beam is shaped as a rectangular channel.

43. The optical fiber holding structure of claim 30 further comprising:
   a third layer of optical fibers passing between said semi-rigid splint member and said compliant splint member; and
   wherein and at least one internal support includes a compliant internal support between said first and third layers of optical fibers and a semi-rigid internal support between said second and third layers of optical fibers.

44. The optical fiber holding structure of claim 43 wherein said compliant internal support is made of plastic, and said semi-rigid internal support is made of glass.

45. The optical fiber holding structure of claim 30 wherein said semi-rigid splint member and said compliant splint member have a semi-cylindrical shape.

46. A method of holding optical fibers, comprising:

inserting a compliant splint member and a semi-rigid splint member within a heat shrink tube;

inserting at least first and second layers of optical fibers into said heat shrink tube and between said compliant splint member and said semi-rigid splint member;

inserting at least one internal support between said first and second layers of optical fibers; and heating said heat shrink tube containing said compliant splint member and said semi-rigid splint member and said optical fibers to form an optical fiber holding structure, wherein said compliant splint member and said semi-rigid splint member grip said first and second layers of optical fibers.

47. The method of claim 46 wherein said internal support is made of a compliant material.

48. The method of claim 46 further including the step of inserting said first and second layers of fibers in hot melt glue tubes.

49. The method of claim 46 further including:

inserting a third layer of fibers into said heat shrink tube; and wherein the step of inserting at least one internal support includes inserting internal supports between said first and third layers of fibers and between said second and third layers of fibers.

50. The method of claim 46 further including ribbonizing each of said layers of fibers.

51. The method of claim 46 further including splicing fibers together in each of said layers of fibers.

* * * * *